INVENTOR.
Lev A. Trofimov
BY Harry P. Canfield
ATTORNEY

May 18, 1948. L. A. TROFIMOV 2,441,604
DIFFERENTIAL GEARING CONTROL BY ELECTRICAL MACHINE
Filed June 4, 1942 3 Sheets-Sheet 3

Inventor
Lev A. Trofimov
Harry P. Canfield
Attorney

Patented May 18, 1948

2,441,604

UNITED STATES PATENT OFFICE 2,441,604

DIFFERENTIAL GEARING CONTROL BY ELECTRICAL MACHINES

Lev A. Trofimov, Willoughby, Ohio

Application June 4, 1942, Serial No. 445,745

4 Claims. (Cl. 318—32)

This invention relates to power supplying and controlling systems by which power from a power source is caused to move a load in correspondence with the movement of a controller.

The invention may be applied to various uses, in which a load or object is to be moved in either a forward or in the reverse direction and brought to rest in either direction to position it, illustrative of which uses would be the moving and positioning of the rudder of a ship, or a gun, or a signal, etc.

The invention is also applicable to uses in which the load or object to be moved and positioned always moves in the same direction, say a forward direction and is brought to rest after a desired amount of movement.

Again, the invention may be applied to loads which are to be moved in correspondence with the movement of a controller which for example may be in the form of an operator's wheel or the like, and in such cases the load will move so long as the wheel is turned and at a speed corresponding to its rotational speed, and may be brought to rest by stopping rotation of the wheel, whether the direction of the wheel and of the load be always in the same direction or in the forward or reverse direction, selectively.

The invention may be variously embodied in apparatus, but in the several forms and modifications of its embodiment which have been chosen for illustration and description herein, it comprises in general a constantly running rotary power source; mechanism, preferably differential gearing, through which power from the source is transmitted to the load and through which power is also transmitted or diverted to a load speed controlling apparatus; the load speed controlling apparatus being actuated by a rotary controller, for example a rotary manual controller; and preferably, although not necessarily, the said diverted power being recovered and returned back to the power source.

As will hereinafter appear the invention may be embodied in a power supplying apparatus as a unit, of which the power source is an element, in which case it may be properly considered as a power supplying unit for the purposes mentioned; or it may be considered as a power transmission unit through which power to the load is transmitted from a power source.

It is among the objects of the invention:

To provide generally an improved apparatus for supplying power to a load;

To provide an apparatus for supplying power to a load to move it in correspondence with the movement of a control element;

To provide an apparatus for supplying power to a load to move it in correspondence with the movement of a control element at speed corresponding to the speed of the control element;

To provide apparatus for supplying power to a load to move it in correspondence with the movement of a control element and to bring it to rest upon cessation of movement of the control element;

To provide apparatus for supplying power to a load element to move it in either the forward or the reverse direction or to bring it to rest in correspondence with forward or reverse movement or cessation of movement of a control element;

To provide generally an apparatus for supplying power to a load to move the load in correspondence with the movement of a control element and to cause the load to move either in the forward or the reverse direction or to come to rest and while moving to move at desired speed corresponding to movement in a forward or the reverse direction and at different speeds and to cessation of movement of the control element;

To provide an improved apparatus for moving and stopping a load to position it;

To provide an apparatus for supplying power to move a load and position it in correspondence with movements of a control element;

To provide a power supplying apparatus such as referred to in the foregoing objects and in which whether the load is moving or is at rest and whether it is moving at one speed or at another speed the power for moving it is supplied by a continuously running motor.

Other objects will be apparent to those skilled in the art to which my invention appertains. My invention is fully disclosed in the following description taken in connection with the accompanying drawing in which, Fig. 1 is a view in some respects diagrammatic illustrating an embodiment of my invention;

Figs. 2, 3, and 4 are diagrammatic views illustrating in modified form certain electrical apparatus shown in Fig. 1;

Figure 1:
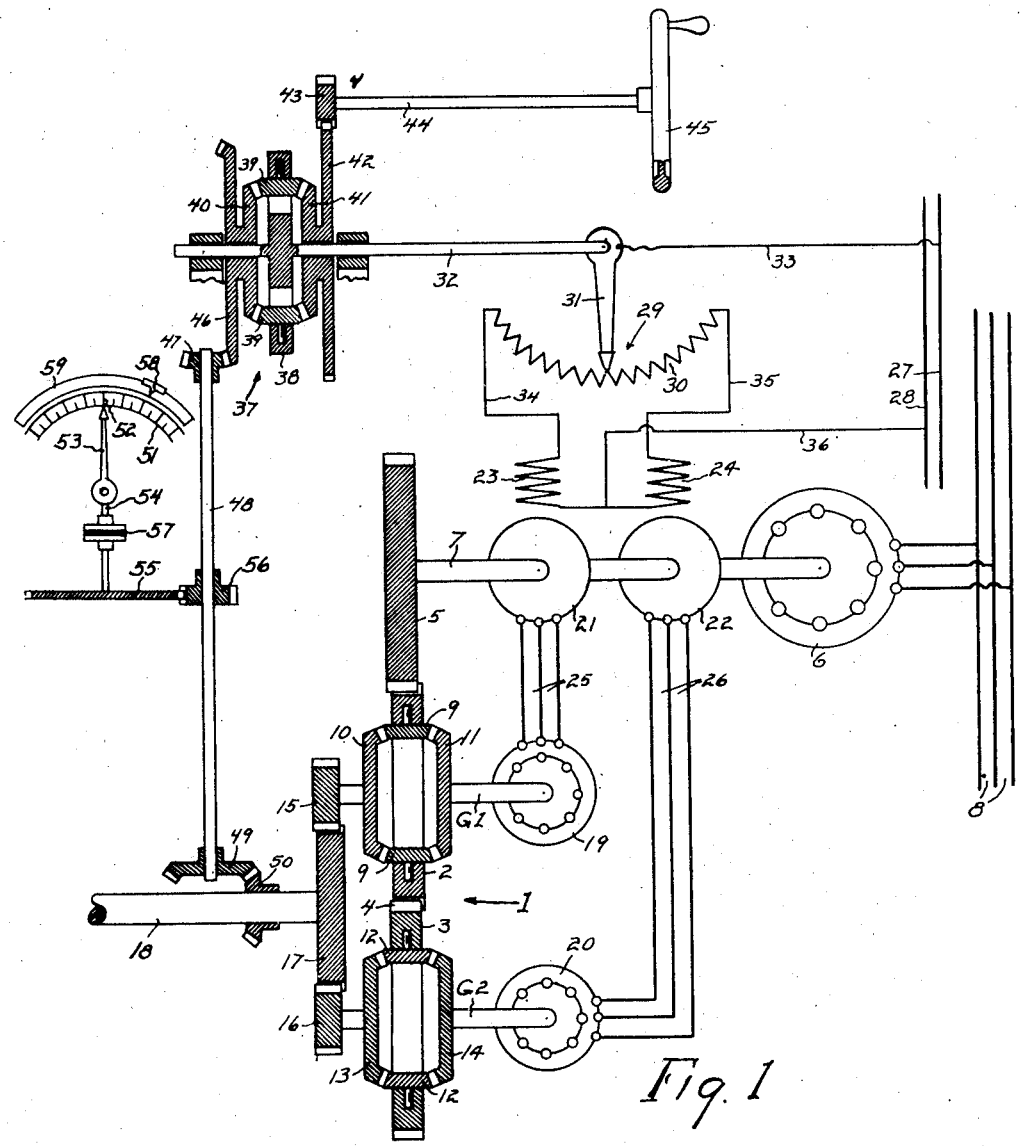

Referring now to Fig. 1 of the drawing, which illustrates an embodiment of my invention, I have shown generally at 1 a double differential gearing mechanism comprising a pair of spiders 2 and 3 rotatably driven in opposite directions, and this is conveniently effected by providing gear teeth on their peripheries and meshing their gear teeth together as at 4, and by driving one of the spiders, say the spider 2, by a gear 5 meshed therewith, and which in turn is driven by a power source 6, having a shaft 7 connected to the gear 5.

The power source 6 may be any kind of a motor such as an electric motor, alternating or direct current, or an internal combustion or other engine, and as an example I have chosen to illustrate it in Fig. 1 as a squirrel cage induction motor connected to three phase alternating current supply mains 8. While it is preferred to use a power source motor the speed of which is substantially constant, this as will appear hereinafter is not essential.

The differential spider 2 rotatably supports pinions 9—9 with which are meshed differential gears 10 and 11; and the spider 3 similarly rotatably supports pinions 12—12 with which are meshed differential gears 13 and 14.

The differential gears 10 and 13 are connected respectively to gears 15 and 16 both of which are meshed with a gear 17 connected to a load driving shaft 18 which is to be connected to the load or object to be moved, and which latter has not been shown to simplify the drawing.

The differential gears 11 and 14 are connected respectively to shafts G1 and G2.

For convenience of description the set of gears, namely, the two spiders 2 and 3; and the four differential gears 10, 11, 13, and 14; and the pinions 9 and 12; and the gears 15 and 16; are shown as of a like diameter in each set.

In the arrangement shown and above described, it will be observed that if the shafts G1 and G2 are caused or allowed to rotate at the same speed and in opposite direction, the load shaft 18 will remain at rest; and that if the shaft G1 rotates slower than the shaft G2, the shaft 18 will rotate in one direction, say, the forward direction; and that if the shaft G2 rotates slower than the shaft G1, the load shaft 18 will rotate in the other or reverse direction; and that therefore the direction of rotation of the load shaft 18 and the speed of rotation thereof in either direction will be controlled by the respective speeds of the shafts G1 and G2.

In this connection it may be added that, due to the gear interconnections described, there is always a definite relation between the speeds of the oppositely rotating shafts G1 and G2; that is, for any speed of one of the shafts, say the shafts G1, there is a definite speed at which the other shaft G2 must run, and correspondingly a definite speed at which the load shaft 18 will run; and if the shaft G1 slows down, the shaft G2 speeds up; and this relation is such that the arithmetical sum of the respective speeds of the shafts G1 and G2 is a constant.

In order to control the respective speeds of the shafts G1 and G2 to make them equal or different, to correspondingly cause the load shaft to remain at rest or to rotate in one direction or the other, and at desired speeds in either direction, the shafts G1 and G2 are connected respectively to electric generators 19 and 20 and the electrical loads of these generators are controlled.

With the differential gearing arrangement shown, the torque supplied to the spider 2 will divide equally between the gear 15 and the shaft G1. Thus torque will be developed at the gear 15 in accordance with the development of torque at the shaft G1; and similarly for the gear 16 and the shaft G2; and thus the end result contemplated by this invention is most conveniently developed by a type of generator the electrical load and torque to drive which may be conveniently varied over a wide range.

In the form of Fig. 1, the generators 19 and 20 are for this reason preferably alternating current induction generators energized and operated as will presently be disclosed, and furthermore, in the embodiment of Fig. 1, the power diverted or transmitted through the differential gearing to drive the generators 19 and 20 is not lost in the system but is transmitted back to the shaft 7 and thence to the spiders 2 and 3. This and the advantages thereof will now be described.

Mounted on the shaft 7 of the motor 6 are the rotors of a pair of electrodynamic units 21 and 22 having the general construction of alternating current synchronous motors, the direct current field windings thereof being shown at 23 and 24.

The generators 19 and 20 have the general construction of induction motors, having high resistance rotors, the rotors being connected to the shafts G1 and G2 respectively, and the rotary magnetic fields of which are produced by windings connected respectively by three phase circuits 25 and 26 to the alternating current rotors of the units 21 and 22.

In general terms, if the multiphase stator of a squirrel cage induction motor has three phase alternating current supplied thereto, for example by the circuit 25 of Fig. 1, a rotating magnetic field is produced in its stator; and if the squirrel cage rotor of the motor be driven at a speed greater than that of the rotating field, the motor will act as a generator and supply current back to the circuit 25.

This generator principle is utilized in the embodiment of Fig. 1. The units 21 and 22 operate as exciting generators for the induction generators 19 and 20. When the direct current fields 23 and 24 are energized, the units 21 and 22 generate three phase alternating current in the circuits 25 and 26 to excite the generators 19 and 20. The generators 19 and 20 generate current and supply it back through the circuits 25 and 26 to the units 21 and 22 operating them as synchronous motors. The electrical power supplied thereto is converted thereby into mechanical power and applied to the shaft 7, in the same direction in which it is being driven by the power source motor 6. The units 21 and 22 acting as exciting generators for the induction generators 19 and 20 establish for the latter rotating fields rotating at a number of revolutions per minute determined by the speed of rotation and the number of poles of the units 21 and 22 and the stator winding arrangement of the generators, and this is predetermined in a manner which will be well understood by those skilled in the art so that the revolutions per minute at which the induction generator squirrel cage rotors are driven by their shafts G1 and G2, will be greater than the revolutions per minute of their rotating fields and in the same direction as the rotating fields, and preferably also so that when the load shaft 18 is at rest and the shafts G1 and G2 are rotating at equal speeds, the speeds of the induction generator rotors will be twice that of the speed of the induction generator rotating fields. Thus throughout a wide range of speeds for the load shaft 18, the generator 19 or 20 which is rotating at the lower speed will still be rotating faster than the rotation of the magnetism in its stator and acting as a generator.

As illustrative of the above described relations, the motor 6 may be one having a speed of 1800 R. P. M. which, with the load shaft 18 at rest will cause the rotors of the generators G1 and G2 to rotate at 3600 R. P. M. corresponding to which the rotary field of the generators 19 and 20 would preferably have a rotary speed of 1800 R. P. M. and this will be supplied to these fields by the units 21 and 22 acting as generators and driven at 1800 R. P. M. by the motor 6 if they are four pole generators.

With the arrangement illustrated in Fig. 1, to vary the electrical load of the induction generators 19 and 20 relatively, to cause one shaft G1 or G2 to rotate slower than the other, it is only necessary to vary relatively the energization of the direct current fields 23 and 24 of the units 21 and 22, and this is done in a manner presently to be described.

As is now believed to be clear there is a degree of energization for the windings 23 and 24 at which the generators 19 and 20 have equal loads and the load shaft 18 remains at rest, and that when the relative energization of the windings 23 and 24 is changed the generator loads become unbalanced and the load shaft 18 rotates in one direction or the other and at a speed commensurable with the amount of difference of the energization of the fields 23 and 24. Preferably the windings 23 and 24 are alike or produce equal magnetic effects for the same degree of energization, and the units 21 and 22 are preferably identical, and the induction generators 19 and 20 are preferably identical.

In brief, the windings 23 and 24 are energized from direct current supply mains 27 and 28 through a rheostat shown generally at 29 comprising a resistor 30 and a rotary rheostat arm 31 connected to and rotatable with a shaft 32. Current from the main 27 flows by a wire 33 to the rheostat arm 31 and thence to an intermediate point on the resistor 30 and there divides part flowing by a wire 34 to the field winding 23 and part by wire 35 to the field winding 24 and thence to a common wire 36 to the other supply main 28.

With the rheostat arm 31 in a middle position, the two fields 23 and 24 will be equally energized, and when the rheostat arm is moved in one direction or the other it introduces more resistance in the circuit of one winding and cuts out resistance from the circuit of the other winding and thereby energizes them to unbalanced degrees for the purposes described.

It follows that corresponding to the rotated position of the arm 31, the load shaft 18 will remain at rest or rotate in one direction or the other, and that both the direction of rotation and the speed of such rotation will be determined by the position of the arm 31; and the means for positioning the arm will now be described.

When the load is at rest or at low speed, the generators in general are driven at high speed and develop great torque, and as the load shaft speeds up by acceleration the generators develop less torque. As mentioned the torque of the source motor 6 divides in general between the load shaft 18 and the generators 19 and 20; thus the load is driven at high torque at low speeds and at lower torque at higher speeds, so that the load shaft is supplied in general with constant horsepower at all speeds for a given load.

Also the power delivered to the generators 19 and 20 is given back by them to the source, and therefore the generators do not change the total power supplied from the source motor to the load. The continuously running power source motor operates at constant horsepower and therefore at maximum efficiency at all load speeds for a given load.

Shown generally at 37 is a differential gearing mechanism comprising a spider 38 rotatably supporting pinions 39—39 with which are meshed differential gears 40 and 41. The spider is connected to the aforesaid rheostat shaft 32. A gear 42 is connected with or constitutes part of the differential gear 41, and has meshed therewith a gear or pinion 43 having a shaft 44 to which is connected a controller wheel or like device 45. A bevel gear 46 is connected to or constitutes part of the differential gear 40, and meshed therewith is a gear 47 connected by a shaft 48 to a gear 49 which in turn is meshed with a gear 50 on, or connected to, the load shaft 18.

The operation as a whole of the apparatus above-described will now be given.

In order to make the description simple it will be assumed to start with that the rheostat arm 31 is in an intermediate position at which the fields 23 and 24 are equally energized, and the generators 19 and 20 have equal loads, and the shafts G1 and G2 accordingly rotate at equal speeds, and the load shaft 18 is accordingly at rest. This of course assumes that the source power motor 6 is running.

If now it be desired to have the shaft 18 rotate in one direction, the hand wheel 45 will be turned by the operator in the corresponding direction. The differential gear 40 of the gearing 37 is at this time at rest and the operator's hand wheel by rotating the shaft 44 and the gear 43 and the differential 41, reacts through the pinions 39—39 and rotates the spider 38, thereby turning the shaft 32 and moving the rheostat arm 31 from its middle position, strengthening one of the fields 23—24 and weakening the other, and thereby making the loads of the generators 19 and 20 different and as described above, causing the shaft 18 to rotate.

Rotation of the shaft 18 communicated through the gears 49—50 and the shaft 48 and the gears 47—46 to the differential gear 40, rotates it. The direction of rotation is arranged so that the gear 40 is driven in the direction opposite to that of the gear 41.

As a consequence, rotation of the gear 40 neutralizes the effect of rotation of the gear 41, and rotation of the shaft 32 and of the arm 31 is accordingly affected, depending upon what type of movement the operator gives to the wheel 45.

If the operator moves the hand wheel 45 a definite number of revolutions, or a definite fraction of a revolution, and then stops rotating it, the arm 31 will thereby be moved a definite amount away from its mid position, and rotation of the shaft 18 will occur and after a corresponding number of revolutions or angle of one revolution, will, through the mechanism just described, return the arm 31 to its mid position which will stop the shaft 18 in its moved position.

On the other hand, if the operator keeps on turning the hand wheel 45, say, at uniform velocity, the rheostat arm 31 will move away from the middle position, and rotation of the main shaft 18 resulting therefrom will slow down the movement of the arm 31 and finally bring it to rest in a position at which the fields are unbalanced, and the shaft 18 will continue to rotate, as long as the hand wheel is rotated; and if the wheel 45 is rotated rapidly, the shaft 18 will rotate rapidly and vice versa. If the operator should then stop rotating the hand wheel, rotation of the shaft 18 will continue until it moves the rheostat arm 31 to its mid position, and will then stop.

If it should be desirable to move the load shaft with very rapid acceleration, the operator would rotate the hand wheel 45 very rapidly to quickly displace the rheostat arm 31 to produce an immediate generator load imbalance of great amount to quickly start and rapidly accelerate the load shaft 18; and then if it were desirable to quickly bring the load to rest, the operator would reverse the direction of rotation of the hand wheel 45 to supplement the action of the shaft 48 in bringing the rheostat arm 31 back to the intermediate position; or he might even in this manner move the arm 31 with overtravel beyond the intermediate position thereby applying reverse or "plugging" torque on the load shaft 18, to stop it to then position the arm 31 by the hand wheel 45 to hold it stopped. In this manner very great torque can be applied to the load shaft either to start it or stop it.

It is believed to be obvious that a similar operation results in causing the shaft 18 to rotate in the reverse direction of rotation by reverse rotation of the hand wheel 45; and that it may be if desired reversed with a "plugging" action as referred to.

In some cases, it may be desirable to indicate to the operator of the hand wheel 45 the position of the load. This may be done in various ways, and as illustrative of one way to do it, there is shown at 51 a dial scale having an intermediate reference line 52 indicating an intermediate or central or normal position of the load connected to the shaft 18. A dial pointer 53 is mounted on a shaft 54 to rotate therewith and indicate positions on the scale 51 at either side of the central position 52. The shaft 54 has a gear 55 connected thereto which meshes with a gear 56 on the gear shaft 48. A friction clutch 57 may be provided in the line of the shaft 54 by which, upon slipping the clutch the dial pointer may be adjustably positioned on the scale 51.

Rotation of the shaft 18 is thus communicated to the dial pointer 53 and when the shaft 18 comes to rest after movement in either direction the dial pointer 53 will indicate the position to which the load has moved in the forward or reverse direction by indicating points on the dial scale 51 to the right or to the left of the central point 52.

A pre-set scale pointer 58 may be provided movable on an arcuate support 59 and it may be pre-set to indicate a point on the scale 51 to which the dial pointer 53 is to be moved to thereby predetermine a position for the load; and when this is utilized, the operator will manipulate the hand wheel 45 until the dial point 53 moves to the point on the scale 51 indicated by the pointer 58.

As to the generators 19 and 20 of Fig. 1 it has been said that the preferred arrangement is to utilize for these generators alternating current induction generators and in association with the units 21 and 22 on the shaft 7 having the construction of synchronous alternating current motors. In order to emphasize that this is not essential to the practice of my invention, I have shown in Fig. 2 a modification in which direct current generators 60 and 61 are used, driven by the shafts G1 and G2 of the differential mechanism 1 which gearing is here indicated diagrammatically for simplicity; and these generators connected in parallel supply direct current, in opposition, to a single direct current motor 62 on the shaft 7. Electrical loads developed at the generators 60 and 61 control the relative speeds of the shafts G1 and G2 as described hereinbefore, and the power developed therein is transmitted back to the shaft 7 as before, in this case through the motor 62. Corresponding to the field windings 23 and 24 of the form of Fig. 1 are shunt windings 63 and 64 for the generators 60 and 61 and these are differentially energized from the supply mains 27 and 28 by the resistor 30 and by movement of the rheostat arm 31 thereover for the purposes described in the form of Fig. 1. The shaft 32 for moving the rheostat arm may be operated as in Fig. 1 with the end results described above for Fig. 1.

Again, while it has been described above as desirable that the power supplied to the generators on the shafts G1 and G2 be transmitted back to the power supply shaft 7, this also is not essential. In Fig. 3 and Fig. 4 it is shown that this power may be delivered back to the current supply mains. In Fig. 3 direct current motors 60 and 61 are shown as having their armatures connected, in opposition, to the direct current supply mains 27 and 28, and as having field windings 63 and 64 respectively the energization of which is controlled as was described in connection with Fig. 2 where similar generators are shown. Here again the power supplied to the generators from the G shafts is not lost but is conserved.

In Fig. 4 a similar arrangement is shown, but a further conservation of power is effected by utilizing a direct current main motor 65 on the shaft 7 supplied with current from the mains 27—28 to which current is supplied by the generators 60 and 61.

In the foregoing embodiments of my invention, it is contemplated that the main load shaft 18 is to be rotated in either the forward or reverse direction. My invention is however applicable to uses in which only one direction of the main load shaft 18 is wanted and this is shown in Fig. 5.

Figure 5:
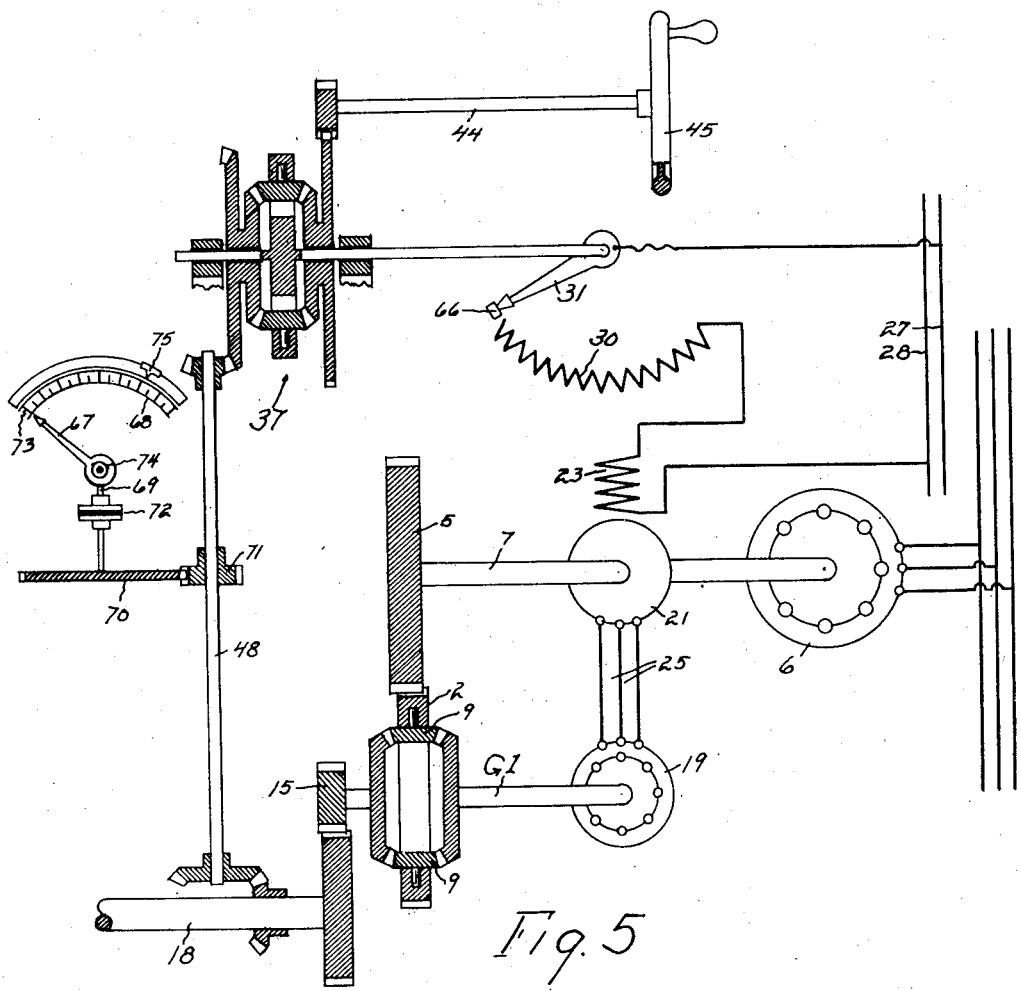
Fig. 5 is a view similar to Fig. 1 illustrating another embodiment of my invention in which some of the operative characterisitics of the form of Fig. 1 have been omitted.

Inasmuch as the same reference characters are here used as on corresponding parts of Fig. 1, the principal difference being in the use of fewer parts, it is believed that Fig. 5 will be understood if we go directly to a description of its operation.

The resistor 30 in this form has an off point 66 and it will be assumed that at the start of operations the rheostat arm 31 is on this off point.

The continuously operating main power motor 6 driving the gear 5 and the spider 2, transmits torque through the pinions 9 to the gear 15 and the shaft G1, but since the rotor of the generator 19 rotates idly, the field winding 23 being unenergized, the main load shaft 18 remains at rest and the rotor of the generator 18 rotates at twice the speed of the shaft 7.

To start the main load shaft 18 rotating, the hand wheel 45 is turned as described for the form of Fig. 1. This moves the rheostat arm 31 over the resistor 30, energizing the field winding 23 and developing electrical load at the generator 19 which develops torque in the shaft G1 and a like torque at the gear 15, and the latter rotates the shaft 18. Rotation of the shaft 18, acting through the gear shaft 48 operates the differential mechanism 37 and therethrough the rheostat arm 31. As in the form of Fig. 1, the shaft 18 may be caused to rotate continuously, or through a part of a revolution or for a number of revolutions, and at different speeds, in accordance with the mode of operation of the hand wheel 45.

Figure 2:
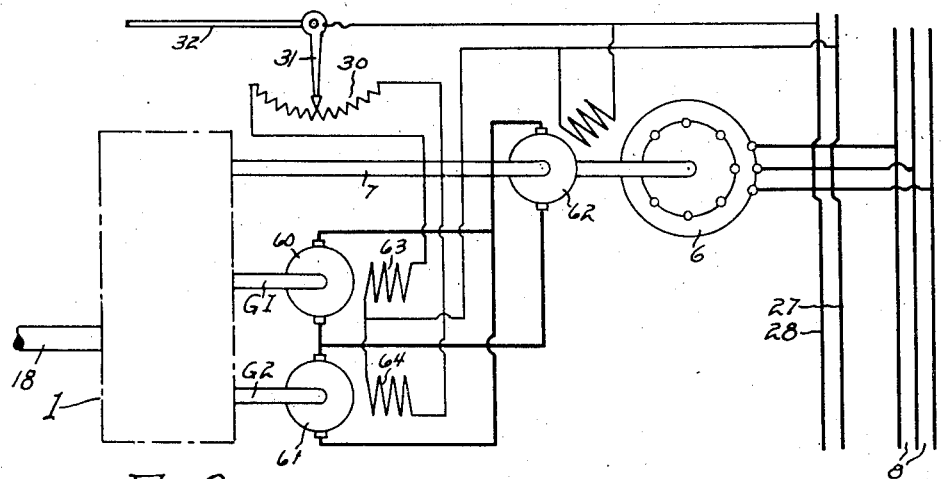
Figure 3:
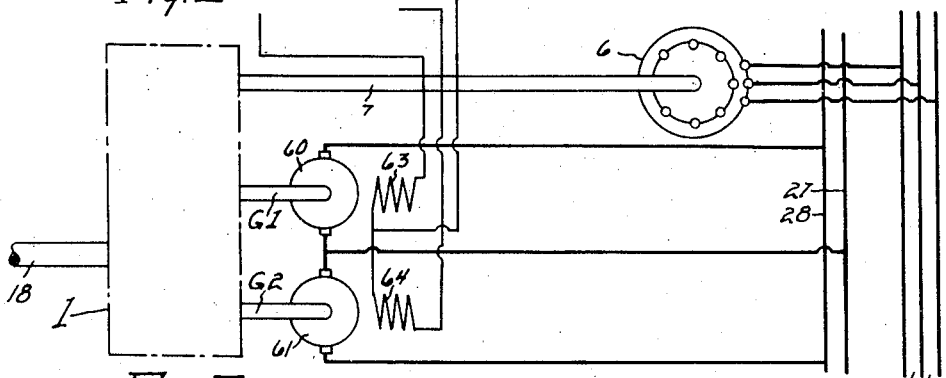
Figure 4:
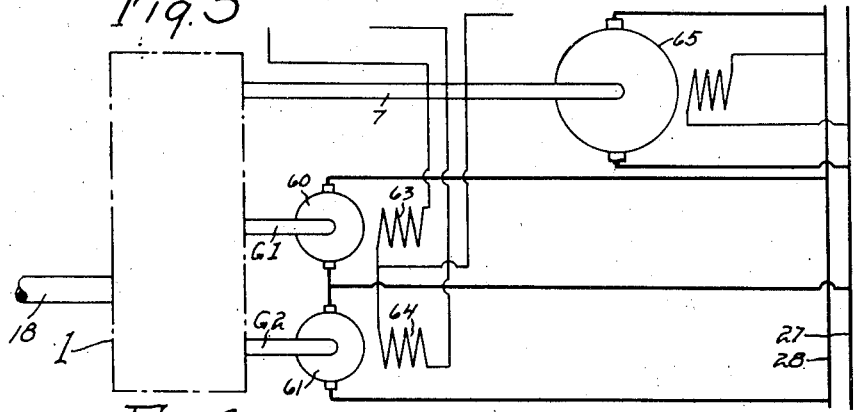

Obviously the system of Fig. 5 may have the modification modes of operation illustrated by the above-described modifications of Figs. 2, 3 and 4.

To indicate to the operator of the handwheel the amount of movement of the load from one position to another by this arrangement, a dial pointer 67 is moved over a scale 68 by a shaft 69 connected by gears 70 and 71 to the gear shaft 48 through a friction clutch 72. By slipping the friction clutch, the dial pointer 67 may be moved by a handle 74 to a reference line 73 on the scale, before movement of the shaft 18 begins. When the operator moves the hand wheel 45 to position the rheostat 31 for movement of the shaft 18, movement of the shaft 18 moves the dial pointer 67 over the scale 68. So long as the operator keeps the hand wheel rotating the dial pointer 67 keeps on moving. When the operator stops rotating the hand wheel and the rheostat arm 31 is accordingly moved to the off position by movement of the shaft 18, and the shaft 18 comes to rest, the dial pointer 67 comes to rest on the scale 68 and indicates the position of the load. A preset dial pointer 75 may be provided as described for the form of Fig. 1 whereby the operator by manipulating the hand wheel 45 may cause the load to be moved to a predetermined position.

Figure 6:
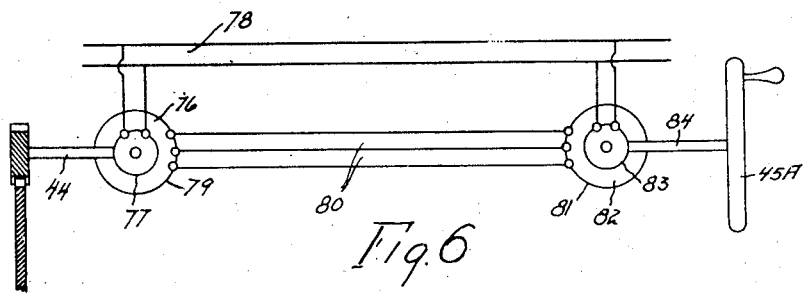
Fig. 6 is a view illustrating a modification which may be employed in the system of Fig. 1 or that of Fig. 5.

In the foregoing I have described the shaft 44 as rotated manually by a hand wheel 45. If desired, the shaft 44 may be rotated, under remote control, by power, in either the forms of Fig. 1 or Fig. 5; and this is shown in Fig. 6.

The said shaft 44 is driven by an electric inductor motor unit 76 of the Selsyn type having a rotor primary 77 energized by alternating current from supply mains 78; and connected to the shaft 44. The secondary 79 is connected by wires 80 to the secondary 81 of a similar unit 82 having a rotor 83 energized from the mains 78 and connected to a shaft 84 on which is mounted a hand wheel 45A.

The operation of such Selsyn type unit is well known. Upon rotating the hand wheel 45A and shaft 84 and rotor 83, the rotor 77 and shaft 44 correspondingly rotate; and upon stopping rotation of the hand wheel the shaft 44 stops rotating. Rotation of the shaft 44 in either direction and bringing it to rest may thus be effected by a handle wheel remotely situated with respect to the rest of the apparatus for the purposes described.

While I have illustrated and described differential gearing of the bevel gear type it will be understood that the differential gearing may be of the planetary type.

And while I have shown certain mutually meshed gears as having certain diameter ratios, for convenience of description, it will be understood that they may have other ratios.

My invention is not limited to the exact details of construction illustrated and described. Changes and modifications may be made within the spirit of my invention without sacrificing its advantages and my invention is comprehensive of all such modifications and changes which come within the scope of the appended claims.

I claim:

1. A power apparatus for driving a load at velocity corresponding to the velocity of a rotary control element, comprising a rotary load element, a continuously rotating source of power, differential gearing comprising three rotary gear elements, one gear element being driven by the power source, another gear element being connected to the load element, an electric generator having a load circuit and driven by the third element, controller means controlling the electric load of the generator to thereby control the speed of rotation of the third gear element to thereby control the speed of the load element, a rotary control element, means by which rotation of the rotary control element constantly tends to operate the controller means to cause it to increase the generator load to thereby increase the speed of the load element and means by which rotation of the load element constantly tends to operate the controller means to decrease the generator load to thereby decrease the speed of the load element at a variable rate commensurable with its speed.

2. A power apparatus for moving a load at a velocity corresponding with the velocity of a rotary control element, in either the forward or reverse direction of rotation comprising a rotary load element, a continuously running rotary source of power, transmission mechanism through which power from the source is transmitted to the load element, comprising two differential gearings, each gearing comprising three gear elements, one element of each gearing being connected to the load element to drive it, another element of each gearing being driven by the source of power, and the remaining elements of the gearings being connected to electric generators respectively to drive them; the generators having electric load circuits; controller means controlling the electric loads of the generators respectively to control the speed and direction of rotation of the load element, a rotary control element, means by which the rotary control element upon rotation thereof in either direction continuously tends to operate the controller means to cause one generator load to be greater than the other to effect driving of the load element at increased speed in a corresponding direction of rotation, and means by which rotation of the load element in either direction continuously tends to operate the controller means to decrease the difference between the generator electric loads to effect decrease of speed of the load element at a rate commensurable with the speed of the load element.

3. A power apparatus for moving a load and stopping it to position it in correspondence with movement and positioning of a control element, comprising a rotary load element, a constantly running rotary source of power, a differential gearing comprising three rotary gear elements, one gear element being driven by the power source, another gear element being connected to the load element, an electric generator having a load circuit and driven by the third element, controller means controlling the generator load to thereby control the speed of rotation of the third gear element to thereby control the movement of the load element, a rotary control element, means by which the rotary control element upon rotation thereof constantly tends to operate the controller means to cause it to increase the generator load to thereby increase the speed of the load element and means by which rotation of the load element constantly tends to operate the controller means to decrease the generator load to thereby decrease the speed of the load element.

4. A power apparatus for moving a load and stopping it to position it in correspondence with movement of a control element, a rotary load element, a continuously running source of rotary power, transmission mechanism through which power from the source is transmitted to the load element, comprising two differential gearings, each gearing comprising three gear elements, one element of each gearing being connected to the load element to drive it, another element of each gearing being driven by the source of power, and the remaining elements of the gearings being connected to electric generators respectively to drive them; the generators having electric load circuits; controller means controlling the electric loads of the generators respectively to control the speed and direction of rotation of the load element, a rotary control element rotatable in alternate direction, means by which rotation of the rotary element in either direction of rotation continuously tends to operate the controller means to cause one generator load to be greater than the other to effect driving of the load element at increasing speed in a corresponding direction of rotation, and means by which rotation of the load element in either direction of rotation continuously tends to operate the controller means to decrease the difference between the generator electric loads to effect decrease of speed of the load element at a rate commensurable with the speed of the load element.

LEV A. TROFIMOV.

REFERENCES CITED

The following references are of record in the file of this patent:

UNITED STATES PATENTS

| Number | Name | Date |
| --- | --- | --- |
| 942,198 | Dey | Dec. 7, 1909 |
| 1,135,596 | Locarni | Apr. 13, 1915 |
| 2,040,014 | Moseley | May 5, 1936 |
| 2,224,710 | Vickers | Dec. 10, 1940 |

FOREIGN PATENTS

| Number | Country | Date |
| --- | --- | --- |
| 558,334 | France | May 23, 1923 |

OTHER REFERENCES

A. C. Phenomena, Steinmetz, fifth edition, McGraw Hill, New York, N. Y., 1916, Fig. 122, page 231.

Theoretical Elements of Electrical Engineering, Steinmetz, fourth edition, McGraw Hill, New York, N. Y., sections 153 to 156.